United States Patent [19]
Ohkubo et al.

[11] Patent Number: 6,073,612
[45] Date of Patent: Jun. 13, 2000

[54] DELIVERY PIPE FOR AN INTERNAL COMBUSTION ENGINE

[75] Inventors: Kenji Ohkubo, Toyota; Masaaki Yano; Masanori Sugiyama, both of Aichi-ken, all of Japan

[73] Assignee: Toyota Jidosha Kabushiki Kaisha, Toyota, Japan

[21] Appl. No.: 09/245,710

[22] Filed: Feb. 8, 1999

[30] Foreign Application Priority Data

Jun. 11, 1998 [JP] Japan .................................. 10-163650

[51] Int. Cl.[7] .................................................. F02M 37/04
[52] U.S. Cl. ........................... 123/456; 123/468; 123/469
[58] Field of Search .................... 123/456, 468, 123/469, 470

[56] References Cited

U.S. PATENT DOCUMENTS

| | | | |
|---|---|---|---|
| 5,143,039 | 9/1992 | Gmelin | 123/470 |
| 5,168,856 | 12/1992 | Lorraine | 123/468 |
| 5,172,671 | 12/1992 | Peters et al. | 123/470 |
| 5,595,160 | 1/1997 | Matsumoto et al. | 123/456 |
| 5,704,334 | 1/1998 | Kato | 123/456 |
| 5,735,247 | 4/1998 | Tsuzuki et al. | 123/470 |
| 5,782,222 | 7/1998 | Morris et al. | 123/456 |

FOREIGN PATENT DOCUMENTS

| | | |
|---|---|---|
| 6-81749 | 3/1994 | Japan . |
| 8-246992 | 9/1996 | Japan . |
| 8-312502 | 11/1996 | Japan . |

*Primary Examiner*—Thomas N. Moulis
*Attorney, Agent, or Firm*—Oliff & Berridge, PLC

[57] ABSTRACT

Deformation of a delivery pipe in which injectors for injecting fuel into the combustion chambers of corresponding cylinders in an internal combustion engine are accommodated, is suppressed, thereby preventing deterioration of the fuel sealing. At least two mounting portions are provided on respective lengths of the delivery pipes that extend outward from opposite ends of a length of the delivery pipe along which injector-inserting portions are disposed for accommodating the injections. This arrangement of the mounting portions prevents deformation of at least the length of the delivery pipe in which the injector-inserting portions are disposed, thereby preventing deterioration of the fuel sealing between the injectors and the injector-inserting portions of the delivery pipe which could otherwise be caused by high-pressure fuel, thermal contractions at very low temperatures, or the like.

4 Claims, 5 Drawing Sheets

DELIVERY PIPE FOR AN INTERNAL COMBUSTION ENGINE

INCORPORATION BY REFERENCE

The disclosure of Japanese Patent Application No. HEI 10-163650 filed on Jun. 11, 1998, including the specification, drawings and abstract, is incorporated herein by reference in its entirety.

BACKGROUND OF THE INVENTION

1. Field of the Invention

The present invention relates to a delivery pipe for use in an internal combustion engine that supplies fuel to the combustion chamber of each cylinder and injects fuel directly into the combustion chamber.

2. Description of Related Art

An in-cylinder fuel injection internal combustion engine in which fuel is injected directly into the combustion chamber of each cylinder is well known in diesel engines. Adoption of in-cylinder fuel injection in gasoline engines has also been proposed for the purpose of improving responsiveness of the engine, and the like.

In a typical in-cylinder fuel injection internal combustion engine, fuel from a fuel tank is pressurized by a high-pressure pump. After high-pressure fuel pressurized by the pump is supplied to a delivery pipe, high-pressure fuel is injected directly into the combustion chamber of each cylinder, from a corresponding one of injectors connected to the delivery pipe.

Among delivery pipes used in in-cylinder fuel injection internal combustion engines, a delivery pipe provided with a mounting portion for mounting the delivery pipe to the cylinder head of an internal combustion engine is described in, for example, Japanese Patent Application Laid-Open No. HEI 8-312502. The delivery pipe described in this laid-open patent application is shown in FIG. 5. A delivery pipe 202 has injector-inserting portions 200 for mounting injectors (not shown). A mounting portion 204 is formed near and corresponding to each injector-inserting portion 200.

The mounting portions 204 are for mounting the delivery pipe 202 near the mounting portion 204 to a cylinder head (not shown). Injectors are mounted to the injector-inserting portions 200, via O-rings (not shown).

In the delivery pipe 202 as described in Japanese Patent Application Laid-Open No. HEI 8-312502, the delivery pipe 202 is fastened to a cylinder head by screwing bolts into the cylinder head through screw holes 204a extending through the individual mounting portions 204 in a direction parallel to a plane perpendicular to an axis C of the delivery pipe 202.

The delivery pipe 2 has opposite end portions, 206 and 208. One end portion 206 is provided with a fuel inlet opening (not shown) and an outlet opening (not shown), and the other end portion 208 is provided with a closed internal fuel space (not shown). None of the mounting portions 204 is disposed at either one of the opposite end portions 206 and 208.

In the delivery pipe 202, therefore, opposite end lengths outward of the outermost mounting portions 204 (that is, end lengths extending outward of lines D1 and D2 as indicated by arrows in FIG. 5) cannot readily be restrained. In some cases, the end lengths of the delivery pipe 202, extending outward of the outermost mounting portions 204, deform due to high-pressure fuel supplied into the delivery pipe 202. The end lengths of the delivery pipe 202 outward of the mounting portions 204 may also deform due to various thermal contractions within the delivery pipe 202 caused by ambient temperature changes, particularly at very low temperature ranges.

Since the mounting portions 204 and the injector-inserting portions 200 cannot be provided at exactly the same positions, it is impossible or very difficult to completely restrain the delivery pipe end lengths extending outward of the mounting portions 204, as indicated in FIG. 5, in order to prevent deformation of the end lengths of the delivery pipe 202. Therefore, an injector connected to one of the end lengths of the delivery pipe 202 (an injector connected to the injector-inserting portion 200 at the extreme left in FIG. 5) may suffer a loosening of its junction with the delivery pipe 202, thereby causing deterioration of the fuel sealing.

SUMMARY OF THE INVENTION

Accordingly, it is an object of the present invention to prevent deterioration in the fuel sealing property of injector-inserting portions by suppressing deformation of a delivery pipe.

In one aspect of the invention, a delivery pipe is provided for a plurality of cylinders of an internal combustion engine, for supplying fuel to injectors that inject fuel directly into combustion chambers of the corresponding cylinders. The delivery pipe includes injector-inserting portions to which the injectors are mounted, and at least two mounting portions for mounting the delivery pipe to an engine. The at least two mounting portions are disposed on respective lengths of the delivery pipe, each of which extends outward of an outermost one of the injector-inserting portions in a longitudinal direction of the delivery pipe.

In this delivery pipe, at least one mounting portion for mounting the delivery pipe to the internal combustion engine is disposed on each of the respective lengths of the delivery pipe extending outward of the injector-inserting portions in the longitudinal direction of the delivery pipe. Therefore, at least a length of the delivery pipe in which all the injector-inserting portions are provided can be firmly restrained to prevent deformation thereof. Therefore, this delivery pipe is able to prevent deterioration of the fuel sealing between the delivery pipe and the injectors.

The above-described arrangement of the mounting portions enhances the mounting rigidity of the delivery pipe. Therefore, it becomes possible to reduce the rigidity of the delivery pipe itself while preventing deterioration of the fuel sealing property, so the weight and production cost of the internal combustion engine can be reduced. Furthermore, it also becomes possible to reduce the size of bolts or the like for fastening the delivery pipe to the internal combustion engine, with corresponding size reductions of the mounting portions of the delivery pipe and mounting portions provided in the internal combustion engine. Therefore, the engine weight and the production cost as a whole can be reduced.

The thus-enhanced mounting rigidity of the delivery pipe reduces the effect of lateral forces on the injectors. Therefore, the effect of lateral forces on the flow characteristic of the injectors is reduced. Therefore, it becomes possible to reduce the rigidity of the injectors, so that a production cost reduction and a weight reduction can be achieved.

In a delivery pipe according to some embodiments of the invention, at least one mounting portion for mounting the delivery pipe to the engine, in addition to the aforementioned at least two mounting portions, may be provided on a length of the delivery pipe extending between two adjacent injector-inserting portions. In this construction, it is possible to adopt an arrangement in which each injector-inserting portion is interposed between two mounting portions. Therefore, a length of the delivery pipe along which all the injector-inserting portions are provided can be firmly restrained to an enhanced degree, so as to reliably prevent deformation of the delivery pipe. As a result, the aforementioned advantages can be achieved to increased extents.

Furthermore, in the delivery pipe according to some embodiments of the invention, the mounting portions may be disposed on sides of the delivery pipe in a zigzag arrangement astride an arrangement of the injector-inserting portions. In this arrangement, two adjacent mounting portions and an injector-inserting portion therebetween are aligned in a substantially straight line, with the center axes thereof extending parallel. Therefore, when pressure in a cylinder affects the delivery pipe via the corresponding injector, the cylinder pressure does not cause a moment on either of the two mounting portions adjacent to the injector, but merely causes forces on the two mounting portions in the direction of the center axes thereof (which may be the center axes of mounting holes of the mounting portions). Therefore, it becomes possible to further reduce the rigidity of the mounting portions of the delivery pipe. As a result, production cost reduction and weight reduction can be achieved to greater extents.

In another aspect of the invention, a delivery pipe is provided for an in-cylinder fuel injection internal combustion engine that has a plurality of cylinders and injects fuel directly into combustion chambers of the cylinders. The delivery pipe supplies fuel to n injectors arranged in one-to-one correspondence to n cylinders selected from the plurality of cylinders, where n is an integer greater than one. The delivery pipe includes n injector-inserting portions to which the n injectors are mounted, and at least two mounting portions for mounting the delivery pipe to the engine. The at least two mounting portions are disposed on two lengths of the delivery pipe that extend outward from opposite ends of a length of the delivery pipe in which the n injector-inserting portions are provided.

These and other objects, features and advantages of the present invention are described in or are apparent from the following description of preferred embodiments with reference to the accompanying drawings.

BRIEF DESCRIPTION OF THE DRAWINGS

Preferred embodiments of the present invention will be described in detail with reference to the accompanying drawings, in which.

DETAILED DESCRIPTION OF PREFERRED EMBODIMENTS

Figure 1:
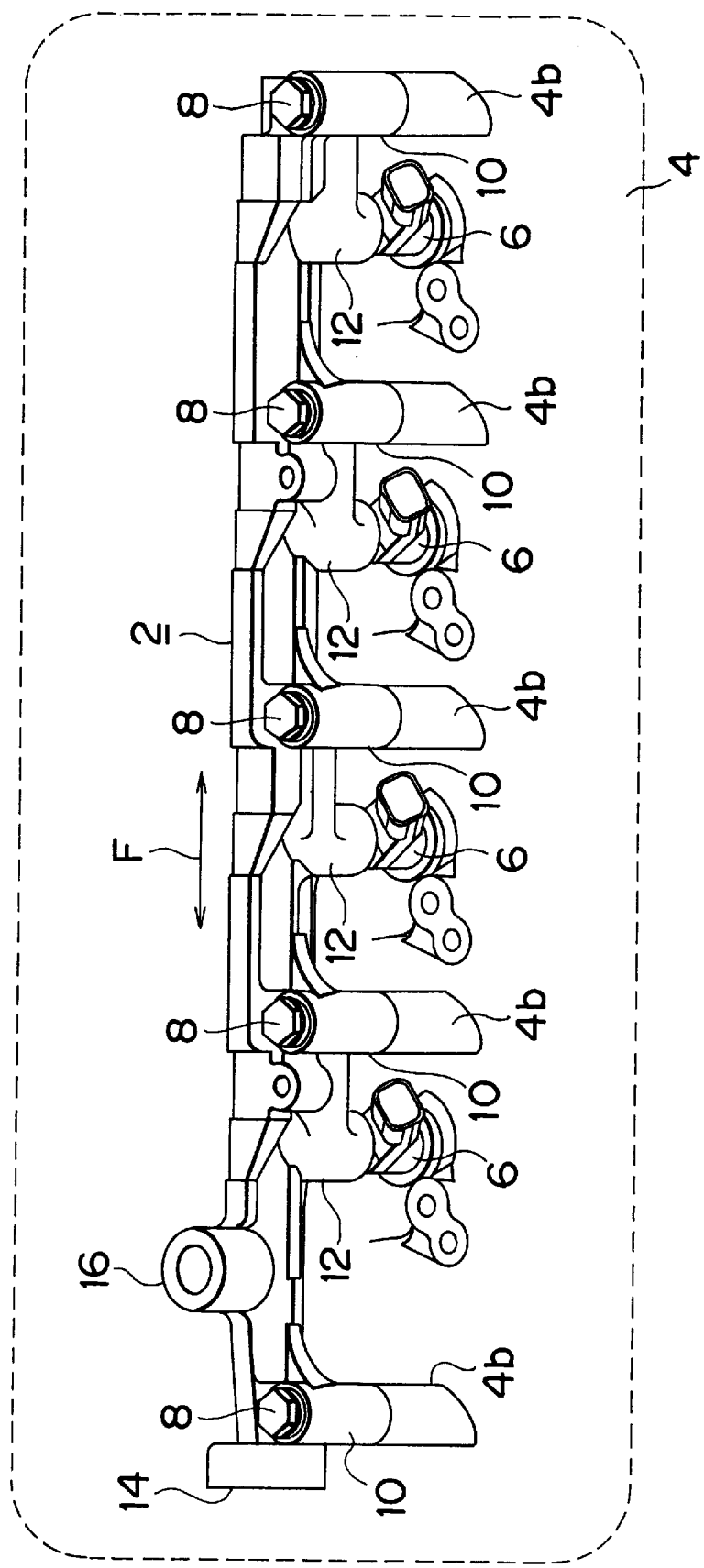
FIG. 1 is a perspective view of a delivery pipe according to a first embodiment of the invention, where the delivery pipe is mounted on a cylinder head.

FIG. 1 is a perspective view of a delivery pipe 2 according a first embodiment of the invention, where the delivery pipe 2 is mounted on an in-cylinder fuel injection internal combustion engine.

The in-cylinder fuel injection internal combustion engine, on which the delivery pipe 2 is mounted, is a gasoline engine. The delivery pipe 2 is mounted on a cylinder head 4 that, together with a cylinder block (not shown), defines combustion chambers.

Injectors 6 are disposed in the cylinder head 4. The injectors 6 are arranged so that a distal end portion of each injector 6 faces into the combustion chamber of a corresponding cylinder of the engine. Fuel supplied from the delivery pipe 2 to each injector 6 is injected directly into the corresponding combustion chamber. The injectors 6 are coupled to the delivery pipe 2 as shown in FIG. 1 so that fuel is supplied to the injectors 6 via the delivery pipe 2.

In this type of in-cylinder fuel injection internal combustion engine, the distal end of each injector 6 directly receives cylinder pressure during compression and combustion (expansion). To ensure that fuel will be injected into the combustion chambers against the cylinder pressure, high-pressure fuel is supplied to each injector 6 through the delivery pipe 2, from a high-pressure pump (not shown) connected to the delivery pipe 2 by a high-pressure fuel supply channel (not shown).

Figure 2:
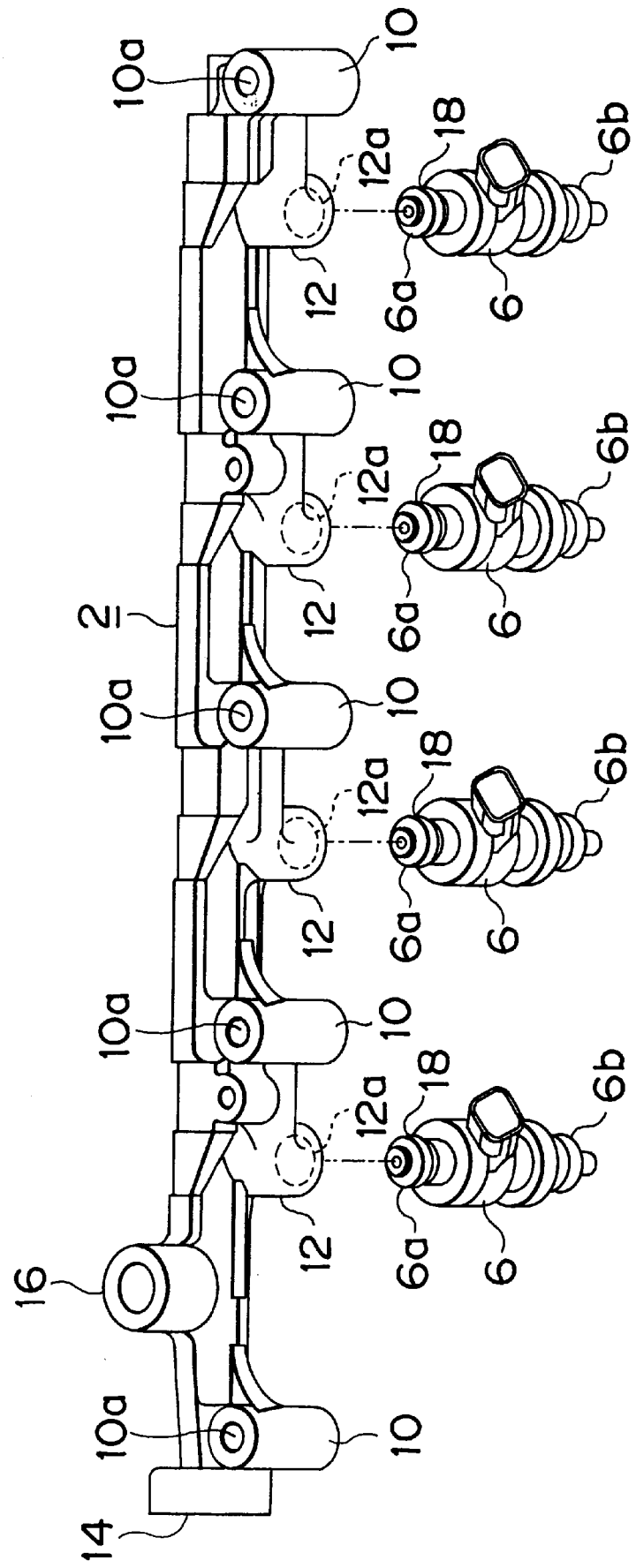
FIG. 2 illustrates a procedure of mounting the delivery pipe of FIG. 1.

The delivery pipe 2 will be described in detail below. The delivery pipe 2 is fastened to the cylinder head 4 by bolts 8. The delivery pipe 2 is provided with mounting hole portions 10 for fastening the delivery pipe 2 to the cylinder head 4. The bolts 8 are inserted into mounting holes 10a, which are formed in the mounting hole portions 10 as shown in FIG. 2, and the bolts 8 are screwed to the cylinder head 4.

The delivery pipe 2 also has injector-inserting portions 12 to which the injectors 6 are fitted. As shown in FIG. 1, the injector-inserting portions 12 protrude from the delivery pipe 2 in an arrangement that matches the arrangement of the injectors 6 corresponding to the cylinders. Since the engine in the illustrated example is a four-cylinder engine, the number of the injector-inserting portions 12 provided is four. As shown in FIG. 2, each injector-inserting portion 12 has an insert hole 12a into which a rearward end portion 6a of the corresponding injector 6 is inserted and fitted.

An inside diameter of the insert holes 12a is slightly larger than an outside diameter of the rearward end portions 6a of the injectors 6, so that the rearward end portion 6a of each injector 6 can be closely fitted into the corresponding insert hole 12a via an O-ring 18. Therefore, the injectors 6 can easily be coupled to the delivery pipe 2 by pressing the rearward end portion 6a of each injector 6 into the corresponding insert hole 12a.

The number of the mounting hole portions 10 for mounting the delivery pipe 2 to the cylinder head 4 of the engine is greater by one than the number of the injector-inserting portions 12 for receiving the rearward end portions 6a of the injectors 6. That is, in the illustrated example, the number of injector-inserting portions 12 is four, and the number of the mounting hole portions 10 is five.

The five mounting hole portions 10 are aligned along an axis F of the delivery pipe 2, with one insert hole portion 12 disposed between every two adjacent mounting hole portions 10.

The insert holes 12a are oriented so that a center axis of each insert hole 12a extends substantially parallel to a plane perpendicular to a center axis of the delivery pipe 2. All the axes of the inset holes 12a are substantially parallel. All the axes of the mounting holes 10a are also substantially parallel.

Fuel from a fuel tank (not shown) is pressurized by the high-pressure pump, and high-pressure fuel from the high-pressure pump is introduced into the delivery pipe 2 through a fuel inlet opening 14, so that high-pressure fuel is supplied to each injector 6 through a supply channel extending inside the delivery pipe 2. A surplus amount of fuel that was not injected from the injectors 6 into the combustion chambers is returned from a fuel outlet opening 16 of the delivery pipe 2 to the fuel tank via a relief valve (not shown).

Figure 3:
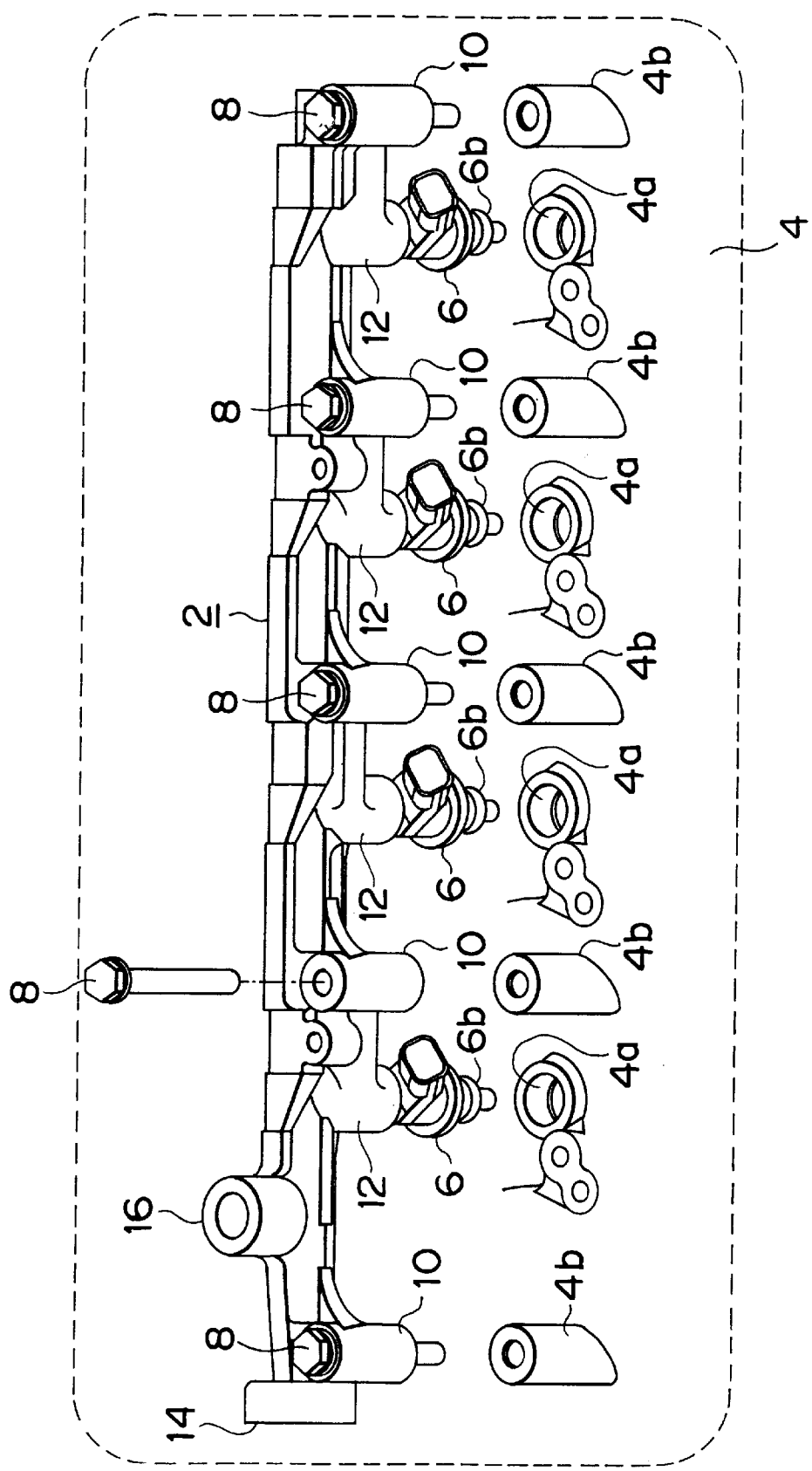
FIG. 3 illustrates a further procedure of mounting the delivery pipe of FIG. 1.

A procedure of mounting the delivery pipe 2 to the cylinder head 4 will be described with reference to FIGS. 2 and 3.

After an O-ring 18 is mounted to the rearward end portion 6a of each injector 6, the rearward end portions 6a of the injectors 6 are inserted into the insert holes 12a of the corresponding injector-inserting portions 12 of the delivery pipe 2, as shown in FIG. 2. Subsequently, the delivery pipe 2 is mounted on the cylinder head 4, as indicated in FIG. 3, by inserting the distal end portion 6b of each injector 6 into a corresponding mounting hole 4a formed in the cylinder head 4 inserting the bolts 8 into the mounting holes 10a of the corresponding mounting hole portions 10 of the delivery pipe 2, and screwing the bolts 8 into corresponding screw hole portions 4b of the cylinder head 4. In this manner, the delivery pipe 2 is mounted on the cylinder head 4 so that each injector 6 faces into the corresponding combustion chamber, as indicated in FIG. 1.

In this construction, fuel is supplied to each injector 6 through the fuel inlet opening 14 and the fuel supply channel inside the delivery pipe 2 during operation of the engine. Fuel is injected from each injector 6 into the corresponding combustion chamber at an injection timing and for a needed duration based on an instruction signal from a controller (not shown). A surplus amount of fuel in the fuel supply channel is returned from the fuel outlet opening 16 to the fuel tank via the relief valve.

The first embodiment of the invention achieves the following advantages.

In the delivery pipe 2, at least one mounting hole portion (that is, mounting portion) 10 is provided outward of each of the opposite ends of a length of the delivery pipe 2 along which the four injector-inserting portions 12 are provided. Therefore, at least the length of the delivery pipe 2 where the four injector-inserting portions 12 are disposed can be firmly restrained to prevent deformation of the delivery pipe 2. As a result, the first embodiment is able to prevent deterioration of the fuel sealing between the delivery pipe 2 and the injectors 6, which could otherwise be caused by high fuel pressure, thermal contractions at very low temperatures, or the like.

The arrangement of the mounting hole portions 10 as described above enhances the mounting rigidity of the delivery pipe 2. Therefore, it becomes possible to reduce the rigidity of the delivery pipe 2 itself, so that the engine weight and the production cost can be reduced.

Furthermore, the enhancement of the mounting rigidity of the delivery pipe 2 achieved by the arrangement of the mounting hole portions 10 makes it possible to reduce the size of the bolts for fastening the delivery pipe 2 to the cylinder head 4, with corresponding size reductions of the mounting hole portions 10 of the delivery pipe 2 and the screw hole portions 4b of the cylinder head 4. Therefore,. although the number of sets of bolts 8, mounting hole portions 10 and screw hole portions 4b is increased by one in comparison with the related art, the engine weight and the production cost as a whole can be reduced.

Further, since the mounting rigidity of the delivery pipe 2 is enhanced by the arrangement of the mounting hole portions 10, deformation of the injector-inserting portions 12 is suppressed. As a result, the effect of lateral forces on the injectors 6 is reduced, so the effect of such lateral forces on the flow characteristic of the injectors 6 is reduced. Therefore it becomes possible to reduce the rigidity of the injectors 6 so that production cost reduction and weight reduction can be achieved.

Further, each injector-inserting portion 12 is positioned between two mounting portions 10. Therefore, when the delivery pipe 2 is mounted to the cylinder head 4, the length of the delivery pipe 2 along which all of the four injector-inserting portions 12 are provided is firmly restrained to prevent deformation of that length of the delivery pipe 2, thereby ensuring the aforementioned advantages.

Further, the four injector-inserting portions 12 are respectively disposed in the intervals of the five mounting portions 10 so as to form an alternating arrangement. Thus, the first embodiment uses a minimum number of mounting hole portions 10 to reliably prevent deformation of the length of delivery pipe portion along which all of the four injector-inserting portions 12 are provided, and, therefore, achieves the aforementioned advantages to the greatest possible extent.

Figure 4:
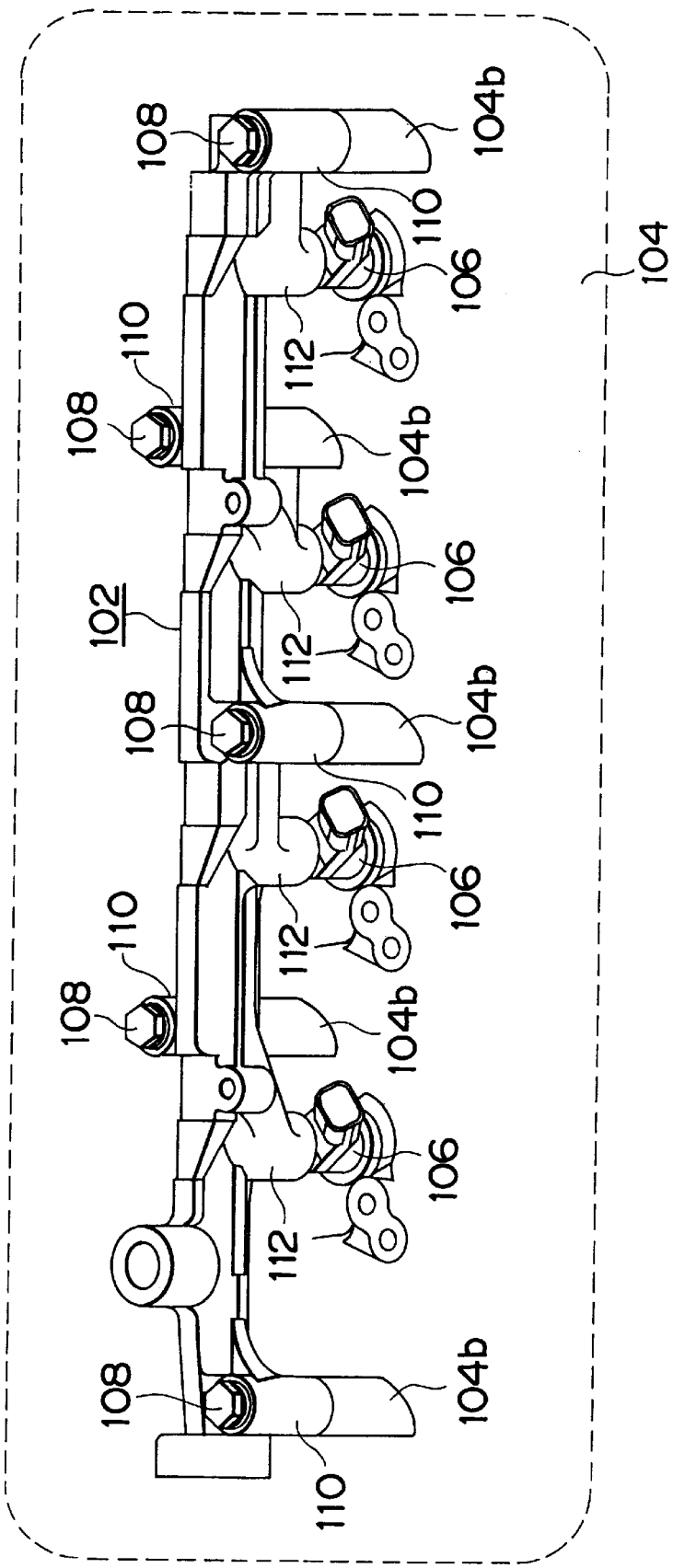
FIG. 4 is a perspective view of a delivery pipe according to a second embodiment of the invention, where the delivery pipe is mounted on a cylinder head.
Figure 5:
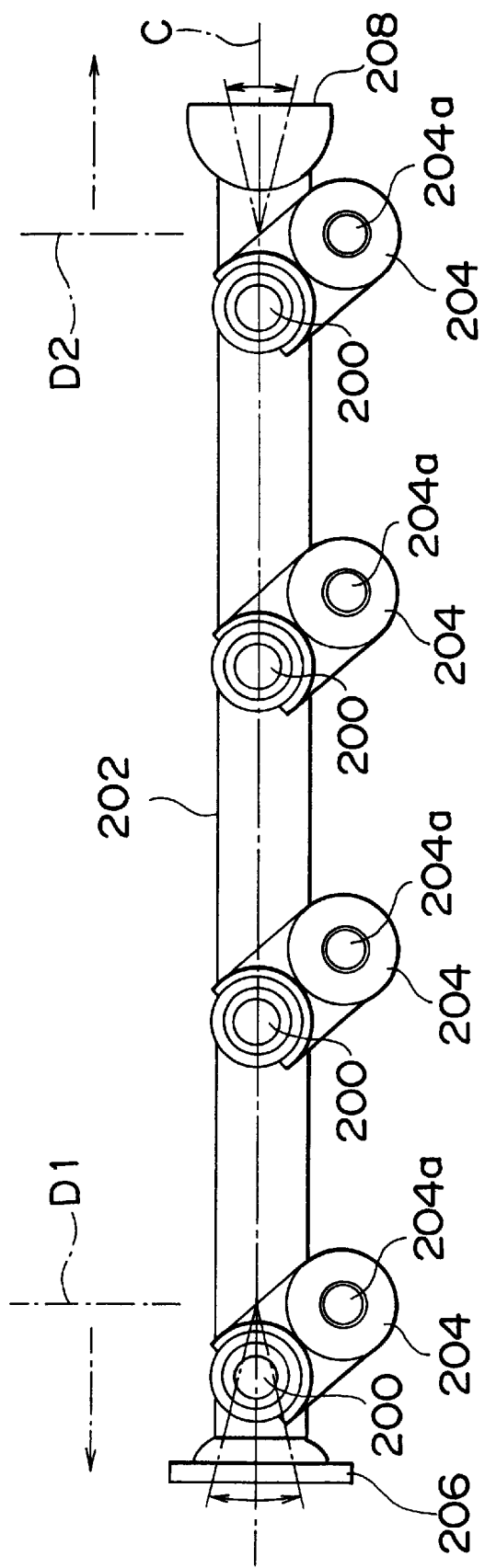
FIG. 5 illustrates the construction of a conventional delivery pipe.

FIG. 4 shows a second embodiment of the invention. The second embodiment differs from the first embodiment in that, as shown in FIG. 4, a delivery pipe 102 of the second embodiment adopts a zigzag arrangement of five mounting hole portions 110 astride a line of four injector-inserting portions 112 that accommodate injectors 106.

More specifically, the mounting hole portions 110 are arranged alternately on opposite sides of the delivery pipe 102, that is, the front side and the back side in FIG. 4, with the injector-inserting portions 112 being separately disposed in the respective intervals of the mounting hole portions 110. Screw hole portions 104b are formed in a cylinder head 104 in a corresponding zigzag arrangement, so that each mounting hole portion 110 may be fastened to the corresponding screw hole portion 104b by a bolt 108. Other features of the delivery pipe 102 are substantially the same as those of the delivery pipe 2 of the first embodiment.

The second embodiment achieves the following advantages, in addition to substantially the same advantages as achieved by the first embodiment.

In the zigzag arrangement of the mounting hole portions 110 astride the line of the injector-inserting portions 112. two adjacent mounting hole portions 110 and an injector-inserting portion 112 between the two adjacent mounting hole portions 110 are aligned in a substantially straight line, with the center axes thereof extending parallel to each other. Therefore, when pressure in a cylinder affects the delivery pipe 102 via the corresponding injector 106, the cylinder pressure does not cause a moment on either of the bolts inserted in the two mounting hole portions adjacent to the injector 106, but merely causes forces on the two mounting hole portions 110 in the direction of the center axes of the mounting holes of the mounting hole portions 110.

Therefore, the rigidity of the bolts 108, the mounting hole portions 110 of the delivery pipe 102, and the screw hole portions 104b of the cylinder head 104 can be reduced. Thus, the second embodiment can reduce the production cost and the engine weight to an even greater extent than the first embodiment.

While the foregoing embodiments are described in conjunction with delivery pipes for in-line four-cylinder engines, a delivery pipe of the invention may also be applied to engines other than a four-cylinder engine.

Although in the foregoing embodiments, one delivery pipe is used to supply fuel to all the injectors, it is also possible to use two or more delivery pipes. For example, if the engine is a V-type engine with two banks of cylinders, (or an engine with more than two banks), each bank is provided with a delivery pipe. In this application, each delivery pipe may have a construction as in the first or second embodiment.

Additionally, although the foregoing embodiments are described in conjunction with gasoline engines, the delivery pipe of the invention may also be applied to a diesel engine.

Furthermore, although the foregoing embodiments are described in conjunction with in-cylinder fuel injection internal combustion engines in which fuel is injected directly into the combustion chambers, it should be apparent that the delivery pipe of the invention can be applied to any type of fuel injection engine in which injectors are inserted into a delivery pipe and the delivery pipe is fastened to the engine and supplies high-pressure fuel to the injectors.

While the present invention has been described with reference to what are presently considered to be preferred embodiments thereof, many equivalent alternatives, modifications and variations will become apparent to those skilled in the art once given this disclosure. Accordingly, the preferred embodiments of this invention as set forth above are considered to be illustrative and not limiting. Various changes to the described embodiments may be made without departing from the spirit and scope of the invention.

What is claimed is:

1. A delivery pipe for supplying fuel to injectors that inject fuel directly into combustion chambers of corresponding cylinders of an internal combustion engine, the delivery pipe comprising:

injector-inserting portions in which the injectors are mounted; and mounting portions, comprising at least two first mounting portions and at least one second mounting portion, through which the delivery pipe is mounted to the engine, the at least two first mounting portions being disposed on respective lengths of the delivery pipe that extend outward of outermost ones of the injector-inserting portions in a longitudinal direction of the delivery pipe, the at least one second mounting portion being disposed on a length of the delivery pipe extending between two adjacent injector-inserting portions, and the mounting portions being disposed on sides of the delivery pipe in a zigzag arrangement astride an axis along which the injector-inserting portions are arranged.

2. A delivery pipe for supplying fuel to n injectors arranged in one-to-one correspondence to n cylinders of a plurality of cylinders in an in-cylinder fuel injection internal combustion engine that injects fuel directly into combustion chambers of the cylinders, where n is an integer greater than one, the delivery pipe comprising:

n injector-inserting portions to which the n injectors are mounted; and mounting portions, comprising at least two first mounting portions and at least one second mounting portion, through which the delivery pipe is mounted to the engine, the at least two first mounting portions being disposed on respective first lengths of the delivery pipe that extend outward from opposite ends of a second length of the delivery pipe on which the n injector-inserting portions are provided, the at least one second mounting portion being disposed on a length of the delivery pipe extending between two adjacent injector-inserting portions, and the mounting portions being disposed on sides of the delivery pipe in a zigzag arrangement astride an axis along which the injector-inserting portions are arranged.

3. A delivery pipe for supplying fuel to n injectors arranged in one-to-one correspondence to n cylinders of a plurality of cylinders in an in-cylinder fuel injection internal combustion engine that injects fuel directly into combustion chambers of the cylinders, where n is an integer greater than one, the deliver pipe comprising:

n injector-inserting portions to which the n injectors are mounted; and mounting portions, comprising at least two first mounting portions and at least one second mounting portion through which the delivery pipe is mounted to the engine, the at least two first mounting portions being disposed on respective first lengths of the delivery pipe that extend outward from opposite ends of a second length of the delivery pipe on which the n injector-inserting portions are provided and the at least one second mounting portion being disposed on a length of the delivery pipe extending between two adjacent injector-inserting portions, wherein a total number of the mounting portions is n+1, and wherein each second mounting portion is disposed on a respective length of the delivery pipe extending between an adjacent two of the n injector-inserting portions.

4. A delivery pipe according to claim 3, wherein the mounting portions are disposed on sides of the delivery pipe in a zigzag arrangement astride an axis along which the injector-inserting portions are arranged.

* * * * *